US007380715B2

(12) United States Patent
Bennett et al.

(10) Patent No.: US 7,380,715 B2
(45) **Date of Patent: *Jun. 3, 2008**

(54) SYSTEMS AND METHODS OF PROVIDING INSERTS INTO ENVELOPES

(75) Inventors: Bruce A. Bennett, Omaha, NE (US); Karl S. Wetzstein, Logan, IA (US); William C. Badalucco, Elkhorn, NE (US)

(73) Assignee: First Data Corporation, Greenwood Village, CO (US)

(*) Notice: Subject to any disclaimer, the term of this patent is extended or adjusted under 35 U.S.C. 154(b) by 10 days.

This patent is subject to a terminal disclaimer.

(21) Appl. No.: 11/445,509

(22) Filed: May 30, 2006

(65) Prior Publication Data

US 2007/0040018 A1 Feb. 22, 2007

Related U.S. Application Data

(63) Continuation of application No. 10/915,167, filed on Aug. 9, 2004, now Pat. No. 7,059,521, which is a continuation of application No. 10/045,589, filed on Nov. 8, 2001, now Pat. No. 6,802,500.

(51) Int. Cl.
*G06K 7/00* (2006.01)

(52) U.S. Cl. ...................................... 235/453; 235/474

(58) Field of Classification Search ................ 235/453, 235/458, 474, 475, 476, 462.01; 270/52.19, 270/52.2, 58.06

See application file for complete search history.

(56) References Cited

U.S. PATENT DOCUMENTS 2,362,134 A 11/1944 Honig
3,717,337 A * 2/1973 McCain ........................ 271/13
3,884,408 A 5/1975 Leiter et al.
3,987,725 A 10/1976 Scantlin
4,060,228 A * 11/1977 Tress et al. .................... 271/14
4,226,410 A 10/1980 McIntosh et al.
4,511,132 A * 4/1985 Muller .................... 270/58.29
4,527,793 A * 7/1985 Bottcher et al. ............ 271/263
4,577,848 A 3/1986 Hams
4,634,107 A 1/1987 Vandersyde et al.
4,697,246 A 9/1987 Zemke et al.
4,718,657 A * 1/1988 Otter et al. ................. 271/184
4,741,524 A 5/1988 Bromage
4,753,430 A * 6/1988 Rowe et al. ............. 270/58.03
5,082,268 A 1/1992 Santoro
5,088,711 A * 2/1992 Newsome ................ 270/52.14
5,171,005 A * 12/1992 Manley et al. ............. 270/1.02
5,327,701 A 7/1994 Dronsfield
5,388,815 A * 2/1995 Hill et al. ...................... 270/32
5,464,142 A 11/1995 Mol et al.
5,495,981 A 3/1996 Warther
5,640,831 A 6/1997 Harrod et al.

(Continued)

*Primary Examiner*—Daniel St.Cyr
(74) *Attorney, Agent, or Firm*—Townsend and Townsend Crew LLP

(57) ABSTRACT

The present invention provides exemplary mail processing systems and methods, including systems and methods for retrieving paper sheets, statements, inserts and/or cards, and inserting same into an envelope. In one embodiment, an apparatus (200) includes a paper feeding mechanism (210) to feed sheets of paper into a collection bin (220) that is adapted to receive in a stack the sheets of paper. The apparatus includes a retrieval mechanism (230) to remove a bottom one of said sheets of paper from the stack, and a deionizer (240) that reduces static electricity in the vicinity of the stack. In this manner, the deionizer helps facilitate removal by the retrieval mechanism of only one of the sheets of paper at a time, by reducing static electricity on the sheets.

13 Claims, 8 Drawing Sheets

U.S. PATENT DOCUMENTS

| | | | | |
|---|---|---|---|---|
| 5,647,583 | A | 7/1997 | Emigh et al. | |
| 5,710,692 | A | 1/1998 | Much et al. | |
| 5,722,221 | A * | 3/1998 | Maltman et al. | 53/493 |
| 5,776,289 | A | 7/1998 | Steidinger | |
| 5,832,702 | A | 11/1998 | Jacobson et al. | |
| 5,896,725 | A * | 4/1999 | Lundstrom et al. | 53/54 |
| 6,094,894 | A | 8/2000 | Yates | |
| 6,135,292 | A | 10/2000 | Pettner | |
| 6,164,043 | A | 12/2000 | Miller et al. | |
| 6,172,688 | B1 | 1/2001 | Iwasaki et al. | |
| 6,183,191 | B1 | 2/2001 | Mondie et al. | |
| 6,202,005 | B1 | 3/2001 | Mahaffey | |
| 6,267,366 | B1 * | 7/2001 | Graushar et al. | 270/1.02 |
| 6,349,242 | B2 | 2/2002 | Mahaffey | |
| 6,357,941 | B1 | 3/2002 | Amano et al. | |
| 6,505,770 | B1 | 1/2003 | Correa, Jr. | |
| 6,585,858 | B1 | 7/2003 | Otto et al. | |
| 6,636,630 | B1 | 10/2003 | Adachi et al. | |
| 6,670,569 | B2 | 12/2003 | Smith et al. | |
| 6,698,748 | B1 | 3/2004 | Crowley | |
| 6,715,268 | B2 | 4/2004 | Hill et al. | |
| 6,802,500 | B2 | 10/2004 | Bennett et al. | |

* cited by examiner

SYSTEMS AND METHODS OF PROVIDING INSERTS INTO ENVELOPES

CROSS-REFERENCES TO RELATED APPLICATIONS

This case is a continuation of U.S. application Ser. No. 10/045,589, filed Nov. 8, 2001, the complete disclosure of which is incorporated herein by reference. This case is related to U.S. Pat. No. 6,670,569, entitled "Mail Handling Equipment and Methods," also filed Nov. 8, 2001, and assigned to the assignee of the present invention, the complete disclosure of which is incorporated herein by reference.

BACKGROUND OF THE INVENTION

The present invention is directed to mail processing systems and methods, and more particularly, to systems and methods for retrieving desired paper sheets, statements, inserts and/or cards and inserting same into an envelope.

Financial institutions, long distance telephone carriers, and a number of other organizations often desire to send a card and accompanying paperwork to a client or potential client. For example, a new credit card customer may fill out a written form, and submit same to a financial institution. Upon approval of the customer's credit, the financial institution then prepares and sends a credit card to the new customer, along with a paper card carrier and/or documentation. In order to send the card and documents to a customer, the information often is sent to a card issuer such as First Data Merchant Services Corporation (FDMS).

The card is typically matched with a carrier, such as a paper insert having an adhesive strip or slots adapted to receive the card. The card and carrier are then placed into an envelope using automated equipment, such as a machine from Böwe Systec Group, headquartered in Augsburg, Germany. In some cases, additional pages or inserts are matched with the new customer card for insertion into the envelope. The automated processing of the cards, carriers, inserts, statements and the like typically involves a multi-step process leading to an envelope stuffed for mailing.

The handling of the number of different inserts, pieces of paper, and cards provides a multitude of opportunities for the processing equipment to be jammed or otherwise malfunction. Typically, equipment used to process the cards and associated statements can be expensive, on the order of one million dollars or more. Notwithstanding the excessive costs of these machines, such machines still can be subject to paper jams and other processing difficulties which may, in some cases, result in system shutdown for trouble shooting. For example, some prior art systems process a series of statements in sequence, with the systems having stacks of paper or statements in certain locations. The stacking and unstacking of paper tends to build up static electricity which, on some occasions, causes adjacent sheets of paper to stick to one another. Further, equipment used to pull individual inserts for insertion into a customer's envelope can present difficulties, including, the failure to pull a desired insert and/or the pulling of duplicate copies of a desired insert. These and other process related problems increase the length of time it takes to process a particular customer's order, cause downtime for the processing equipment and the like.

The present invention relates to machines and techniques that address at least some of the problems of the current process equipment.

BRIEF SUMMARY OF THE INVENTION

The present invention provides exemplary mail processing systems and methods, including systems and methods for retrieving paper sheets, statements, inserts and/or cards, and inserting same into an envelope.

In one embodiment, a mail processing apparatus of the present invention includes a paper feeding mechanism that is adapted to feed sheets of paper, and a collection bin that is adapted to receive in a stack the sheets of paper from the paper feeding mechanism. The apparatus includes a retrieval mechanism that is configured to remove a bottom one of said sheets of paper from the stack, and a deionizer that is adapted to reduce static electricity in the vicinity of the stack. In this manner, the deionizer helps facilitate removal by the retrieval mechanism of only one of the sheets of paper at a time, by reducing static electricity on the sheets.

In one aspect, the deionizer includes a deionizing static bar, such as is commercially available from Simco Industrial Static Control, of Hatfield, Pa. In a particular aspect, the deionizer is positioned so that the sheets fed by the paper feeding mechanism pass over the deionizer and are received by the collection bin.

In one aspect, the retrieval mechanism includes a roller. In another aspect, the collection bin further includes at least one foot for facilitating the removal of only one sheet by stripping off adjacent sheets therefrom.

In some aspects, mail processing apparatus of the present invention further includes a printer for printing alpha-numeric characters on the sheets before the sheets are fed, a card attachment mechanism for attaching a card to the sheet, and/or a sheet folding mechanism for folding the sheet, either before or after the card is attached.

In another embodiment, a mail processing apparatus of the present invention includes a track over which paper sheets pass in sequence, a moving mechanism to move the sheets along the track, and an inserting mechanism to add an insert to one of the sheets on the track. The inserting mechanism includes a grasping mechanism that is adapted to grasp and move the insert onto the sheet, and a nozzle positioned above the track for directing a gas stream onto the insert to hold the insert to the sheet. In this manner, the gas stream, such as a stream of forced air, helps facilitate the passage of the grasping mechanism over both the sheet and the insert when traveling to grasp a subsequent insert, such as for a subsequent sheet.

In one aspect, the inserting mechanism includes a bin to hold a stack of inserts, and at least one vacuum finger to pull a bottom insert from the stack where it is grasped by the grasping mechanism. In alternative aspects, the nozzle is coupled to the grasping mechanism, and/or includes an elongate slit for directing the gas stream. In another aspect, the moving mechanism includes a pair of fingers that move along the track.

In a particular aspect, the mail processing apparatus includes a sensor that is adapted to detect if the insert has been grasped by the grasping mechanism. The sensor may be a pressure sensor, an optical sensor, and the like.

In another aspect, the apparatus includes an indicator that is adapted to indicate if the grasping mechanism fails to grasp the insert, and/or grasps more than one insert. In one aspect, the indicator includes an interrupt circuit coupled to and adapted to stop operation of the moving and inserting mechanisms if the grasping mechanism fails to grasp the insert, or grasps more than the desired number of inserts In still another embodiment, mail processing apparatus of the present invention includes a track, an envelope feeder adapted to feed an envelope onto the track, and an inserting mechanism for placing inserts into the envelope. The apparatus includes a nozzle system for directing a gas into the envelope to hold the envelope open for the inserts. The nozzle system includes a central nozzle adapted to direct gas into a central region of the envelope, and a side nozzle adapted to direct gas near an edge of the envelope.

In one aspect, the apparatus includes a gas adjust nozzle to control a gas flow rate through the side nozzle. In still another aspect, a fixture holds the side nozzle to the central nozzle.

The present invention further includes methods of processing mail and/or inserting inserts into envelopes. In one such embodiment, a method of processing mail includes passing first and second paper sheets along a track, and adding an insert to the first sheet. The insert is added by grasping the insert with a grasping mechanism, moving the insert onto the first sheet, and holding the insert to the first sheet so that the grasping mechanism may pass over both the first sheet and the insert when grasping a subsequent insert for the second sheet. The insert is held, at least partly, by directing a gas stream onto the insert.

In one aspect, the method includes using a sensor to sense whether the grasping mechanism has grasped only one insert, and/or has failed to grasp the insert. In the event the sensor indicates an undesired number of inserts have been grasped, one aspect of the method includes stopping the mail processing. In a particular embodiment, an indicator is used to indicate where in the process line an error has occurred.

In another embodiment, a method of the present invention includes providing a plurality of sheets of paper, feeding the sheets of paper sequentially into a collection bin to form a stack, and retrieving a bottom one of said sheets of paper from the stack with a retrieval mechanism. The collection bin includes a deionizer, such as a static bar over which the sheets pass, that is adapted to reduce static electricity in the vicinity of the stack.

In still another method of the present invention, an insert to be placed into an envelope is provided, and the envelope is fed onto a track. The method includes directing a gas into an opening of the envelope to hold open the envelope, thereby facilitating receipt of the insert. The gas is directed with a central nozzle into a central region of the envelope opening, and with a side nozzle near an edge of the envelope opening.

Other objects, features and advantages of the present invention will become more fully apparent from the following detailed description, the appended claims and the accompanying drawings.

DETAILED DESCRIPTION OF THE INVENTION

Figure 1A:
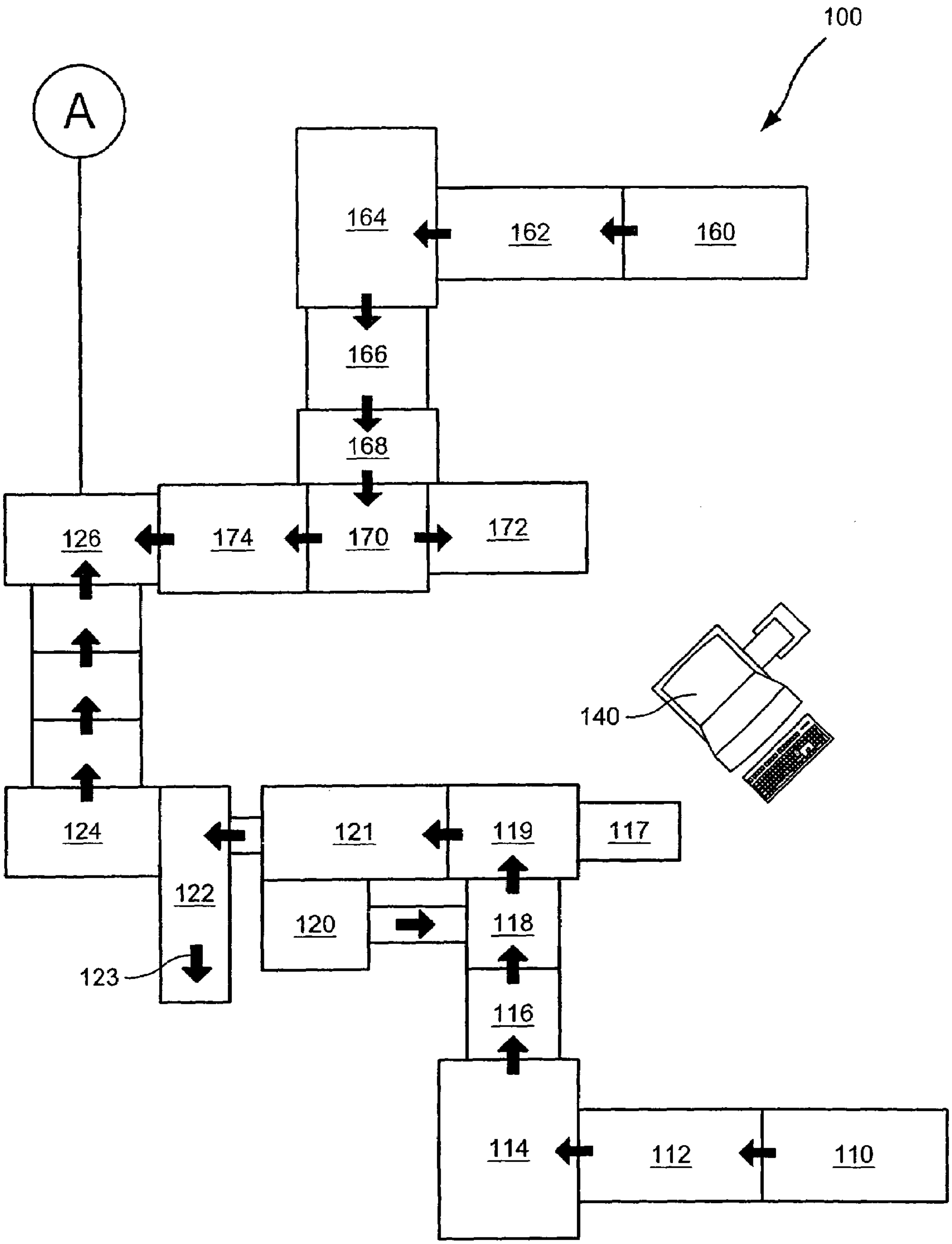
FIGS. 1A and 1B depict a simplified schematic of a mail processing system according to an embodiment of the present invention.
Figure 1B:
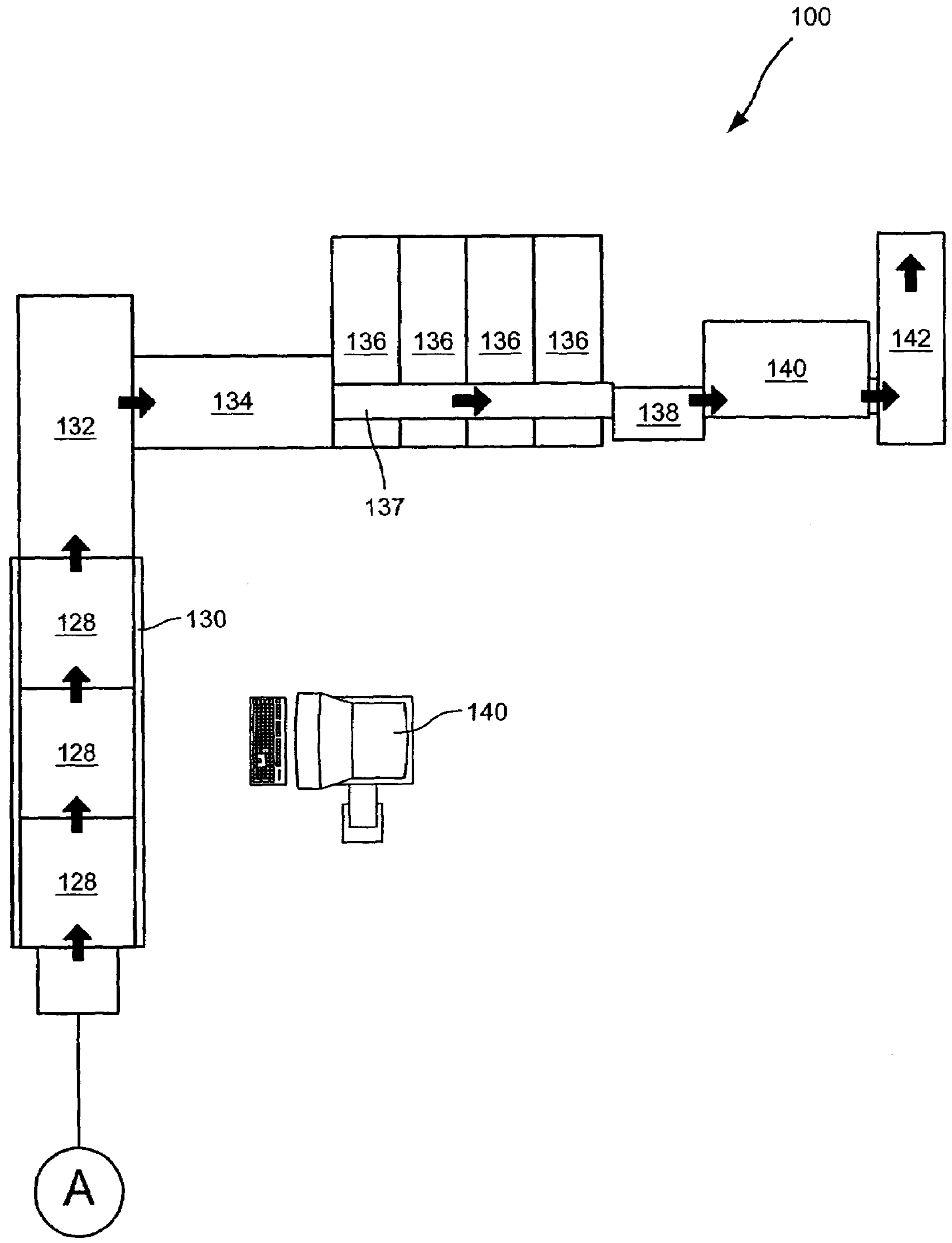

FIGS. 1A and 1B depict a simplified schematic of a mail processing system 100 according to the present invention. System 100 includes a series of stations adapted to produce an envelope stuffed with a desired number of paper documents and one or more cards. Cards processed by system 100 can include credit cards, debit cards, company and stored-value cards, smart cards, phone cards, and the like. Documents processed by system 100 include one or more sheets of paper, such as a customer billing statement, a new cardholder agreement, a renewal card statement, a card carrier, and the like. Documents also may include a variety of paper inserts, such as advertisements and the like.

In the embodiment shown in FIGS. 1A and 1B, system 100 includes a printer 110 adapted to print alpha numeric characters on a statement, a sheet of paper, a card carrier, or the like. Printer 100 prints information such as an account number, a customer name and mailing address, a monetary account limit, and the like, and further may print one or more bar codes. In one embodiment, at least one of the bar codes identifies which inserts, from a plurality of different inserts, are to be sent to the customer with the statement or card.

The printed statements or card carriers (not shown) travel down a belt 112 and are stacked in a stacking unit 114. Further details on stacking unit 114 are discussed in conjunction with FIG. 2, which in one embodiment also operates to at least partially fold the statement or card carrier. The sheets are then sequentially drawn from stacking unit 114 into unit 116.

In one embodiment, unit 116 includes a bar code reader for reading a bar code or other identification mark on the statement or card carrier. The bar code may, for example, identify which inserts are to be later matched up with the card carrier. In another embodiment, unit 116 also reads a number, such as a three digit number, associated with the card carrier to facilitate proper matching with a card having a corresponding number.

In one embodiment, the carrier is transferred from unit 116 into unit 118. A card is received from unit 120 and matched with the corresponding card carrier in unit 118. In one embodiment, the card is glued, placed in slots or otherwise affixed to the card carrier in unit 118. Additional details on unit 120 are described in conjunction with FIG. 3. The mated card carrier and card are transferred to unit 119. If a processing error has occurred, unit 119 deflects the card and card carrier into a bypass tray or receiving area 117. Processing errors may include, for example, mismatched cards and card carriers, and the like. If no error has occurred, unit 119 deflects the card and card carrier into a folding unit 121.

Folding unit 121 performs a fold of the statement or card carrier. In one embodiment, folding unit 121 performs a second fold of the card carrier, resulting in a card carrier that is approximately the size of a business class envelope. In a particular embodiment, the first and second folds of the card carrier produce a Z-fold card carrier. Folding unit 121 further includes a card detection assembly, which operates to detect if the card is missing or if too many cards have been placed in the card carrier. In one embodiment, the card detection assembly tests a thickness of the card carrier to determine if the appropriate number of cards are contained in the card carrier.

If the card detection assembly indicates an error, such as too many cards or a missing card(s), the card carrier is transferred to a bypass tray or receiving area in the direction shown by arrow 123. Transfer may occur along a conveyor belt, a track, or the like. In one particular embodiment, system 100 operates to place cards in card carriers, but is not used for processing further inserts. In this embodiment, the card carriers and cards are passed down conveyor 122 in the direction of arrow 123, and removed from system 100. The card carriers may, if desired, be transported to an envelope stuffing apparatus, a mail room or the like.

If the card detection assembly does not indicate an error, in one embodiment, card carriers are then passed to a paddle wheel assembly 124 to continue processing. As shown in FIG. 1A, paddle wheel 124 operates to place the carrier and card on a track or conveyor belt 130. The cards and card carriers proceed down belt 130, passing under a second paddle wheel assembly 126. In one embodiment, second paddle wheel assembly 126 places a second statement, sheet of paper or the like on top of the card carriers as they pass underneath. For example, the second sheet may contain additional information pertinent to the client or the client account, a cardholder agreement, or the like.

As shown in FIG. 1A, a second printer 160 is adapted to print out the numerical characters and/or bar codes on a second statement or sheet of paper. For example, printer 160 may further print one or more pages of checks for a card user to use. In one embodiment, printer 160 is electrically coupled to the bar code reader in unit 116. In this manner, bar code reader 116 may read the bar code or other identification mark on the card carrier processed through unit 116 and inform printer 160 that a second statement or page is needed to be matched up with the card carrier. In one embodiment, controller 140 facilitates the communication between unit 116 and printer 160. The printed second statement or page passes from printer 160 along a belt 162 and into a stacking unit 164. Stacking unit 164 is similar to stacking unit 114, and performs similar functions. For example, stacking unit 164 stacks a plurality of statements, and then passes the statements one at a time to unit 166 after performing a first fold. Unit 166 is similar to unit 116, and may include a bar code reader for reading a bar code or other identification marks on the statement. Unit 166 further may perform a fold of a second statement in the event the fold is not performed in unit 164. The second statement then passes to unit 168, in which a second fold of the statement is performed. In this manner, the second statement or page, in one embodiment, is a Z-folded second statement to match the general size of the first statement or card carrier. The second statement passes into unit 170, which in one embodiment is a deflection unit 170 similar to unit 119 described above. Deflection unit 170 passes statements to bypass station 172 in the event the second statement is not to be matched with the first statement. For example, bypass unit 172 receives second statements that may have been printed in error. Deflection unit 170 further directs second statements to belt 127 for transporting second statements to second paddlewheel 126. The second statement is then matched with the first statement or card carrier as described above.

The matched pages and card combination proceed along a track or conveyor belt 130, passing under one or more insert bins 128. FIG. 1B depicts three (3) insert bins 128, although a larger or smaller number of bins 128 also may be used within the scope of the present invention. In one particular embodiment, system 100 includes six (6) insert bins 128.

Insert bins 128 contain inserts, such as paper advertisements and informational inserts. These inserts may be added to a particular customer's stack of documents and card passing beneath on belt 130. Inserts contained within bins 128 may be selectively chosen based upon a number of criteria, including customer interest and other factors. For the system 100 shown in FIG. 1 having three bins 128, some customers may receive all three inserts, other customers may receive less than three inserts, while still other customers may receive no inserts. Additional details on insert bins 128, and methods and apparatus for selecting inserts, are found discussed in conjunction with FIGS. 4 and 5, respectively.

In one embodiment, the statements and cards traverse along belt 130 positioned underneath bins 128. In one embodiment, belt 130 provides continuous, fluid movement of the statements. In another embodiment, belt 130 provides incremental movement of the statements, with each statement stopping below each bin 128. Inserts desired to be matched with a particular customer's statements are pulled from bins 128 and placed atop the customer's statement. Upon reaching the end of belt 130, the stack of documents to be sent to the customer are transferred to unit 132 for insertion into an envelope. Additional details on unit 132 are discussed in conjunction with FIG. 6.

The now stuffed envelope, containing a particular customer's statement, inserts and card, is sent to an envelope sealing unit 134. Envelope sealing unit 134 sprays a mist of water or other fluid on the envelope flap and proceeds to seal the moistened flap. Unit 134 further flips the stuffed envelope over to expose the envelope front. In one embodiment, envelopes processed through system 100 are windowed envelopes, with information printed on the card carrier or other insert exposed through the envelope window. The envelopes proceed into one or more diverters 136. Diverters 136 may divert stuffed envelopes for a variety of reasons, including, but not limited to, additional processing errors, and envelopes requiring special or additional handling. In one embodiment, at least one diverter 136 is used for stuffed envelopes to be sent by overnight courier, such as Federal Express. In another embodiment, at least one diverter is used to receive envelopes intended to be sent by airmail, or the like. Envelopes intended for standard mail delivery, such as by the U.S. Postal Service First Class Delivery, are put past diverters 136 along belt or track 137 and proceed to a first postage meter 138. First postage meter 138 applies a one ounce postage to envelopes requiring only a single ounce of postage. Envelopes proceed to a second postage meter unit 140, in which a second ounce of postage is applied. Alternatively, the entire two ounce postage is applied in second postage meter station 140, with the envelope passing first postage meter station 138 without receiving postage. The envelopes have now been properly stuffed, sealed, and postaged and proceed to an output station 142. The envelopes then may be received from output station 142 for delivery to the intended customers.

System 100, in one embodiment, includes one or more controllers 140 for monitoring and/or controlling the process through system 100. An operator may view the status of documents on the computer screen associated with a particular controller 140, and/or input data as needed into controller 140 to facilitate operation of system 100. Further, controllers 140 facilitate the coordination between printers 110, 160, bar code readers in system 100 and insert bins 128, to ensure each customer receives the desired card(s) and document(s).

Figure 2:
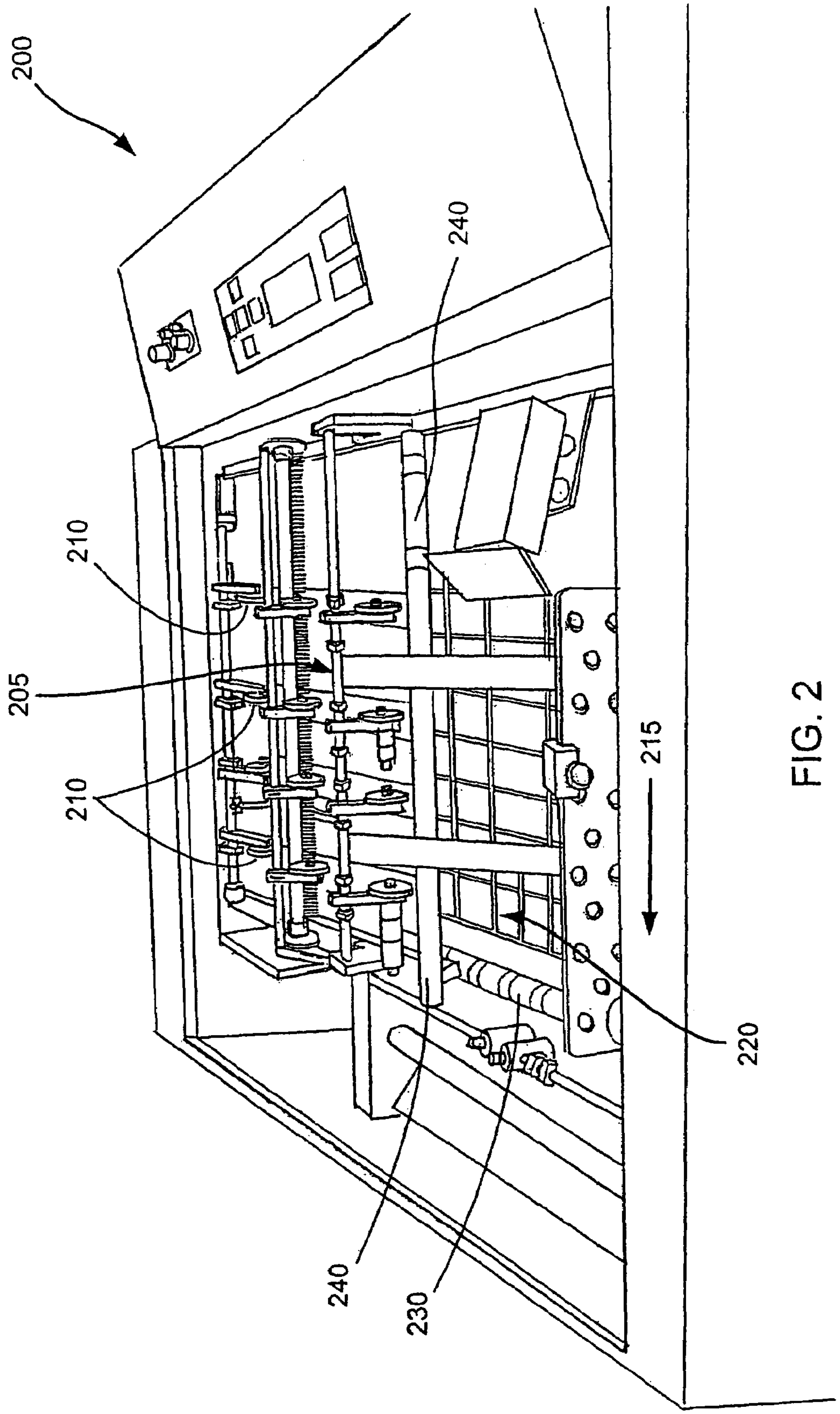
FIG. 2 is an overall view of a portion of a mail processing apparatus according to the present invention.

Turning now to FIG. 2, additional details on a statement stacking unit or apparatus 200 will be described. In one embodiment, unit 200 corresponds to unit 114 shown in FIG. 1. Statement stacking apparatus 200 receives a series of statements or card carriers. The statements may be generated from printer 110, as shown in FIG. 1, and pass along belt 112 prior to entering apparatus 200. The statements enter apparatus 200 one at a time by traveling over a plurality of rollers 210 in the direction indicated by arrow 205 in FIG. 2. The statements are stacked one on top of another in a receiving area 220. The stacked statements in receiving area 220 are subsequently drawn by a roller 230 in the direction indicated by arrow 215. Statements are drawn by roller 230 and proceed to an adjacent machine for processing. In one embodiment, roller 230 is a continuously moving roller having a 360° rotational movement. In this manner, roller 230 pulls the bottom statement from the stack of statements in receiving area 220.

The transfer of paper statements into apparatus 200, over rollers 210 and into receiving area 220 tends to create, over time, a build-up of static electricity on the stacked statements. The creation of static electricity on the paper statements can cause two or more sheets to stick together. As a result, roller 230 draws, on some occasions, more than one paper statement therethrough. As will be appreciated by those skilled in the art, two or more customer statements stacked together can result in the shutdown of system 100, and the manual manipulation of one or more units of system 100 to locate the misstacked statements.

One aspect of the present invention involves the use of a deionizer 240 in unit 200 to deionize the air surrounding the stacked statements. In a particular embodiment, deionizer 240 is placed in or near receiving area 220, so that the paper statements pass over deionizer 240 just prior to dropping on the stack formed in receiving area 220. In a particular embodiment, deionizer 240 is a deionizing static bar 240, such as that commercially available from Simco Industrial Static Control Company of Hatfield, Pa. In this manner, the use of deionizer 240 reduces the static electricity on the sheets, thereby reducing or eliminating the likelihood that more than one sheet will be drawn by roller 230.

In one embodiment, statements or card carriers are drawn from receiving area 220 and folded, prior to passing from unit 114. In a particular embodiment, unit 114 performs a one-third fold by folding up the bottom approximately one-third of the sheet/carrier, or folding down the top approximately one-third of the sheet/carrier. As mentioned in conjunction with FIGS. 1A-1B, in one embodiment the statement or card carrier passes from unit 114 and is matched with a card. Cards are attached to the card carriers in unit 118 (FIG. 1), with cards being received from card reader 120.

Figure 3:
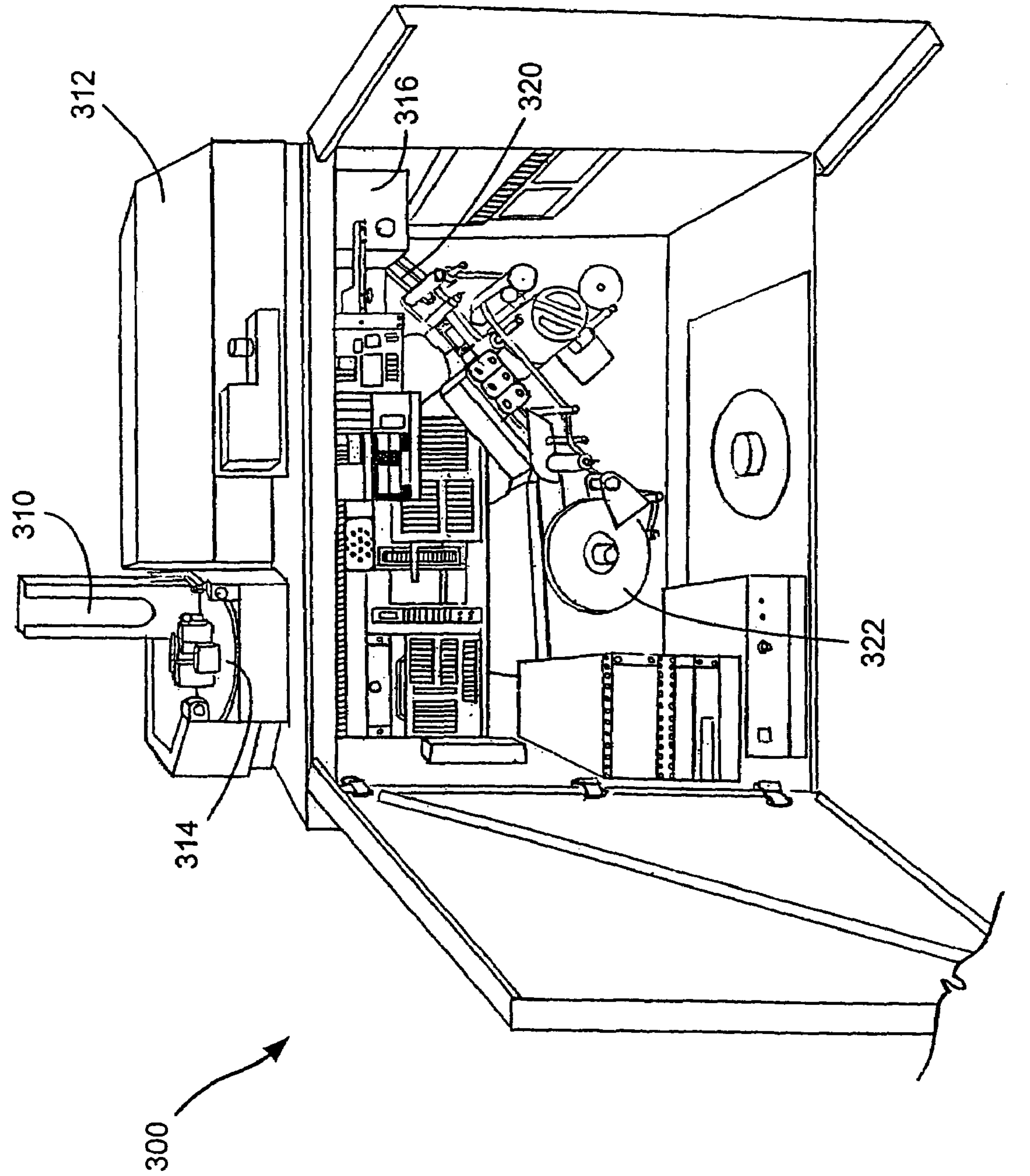
FIG. 3 is an overall view of a second portion of a mail processing apparatus for reading a card and affixing tape thereto.

FIG. 3 depicts an apparatus 300 which, in one embodiment, corresponds to card reader 120 shown in FIG. 1. Apparatus 300 includes one or more magazines 310 adapted to hold a stack of cards (not shown). In one embodiment, apparatus 300 has four magazines 310 on a rotating carousel 314. As each magazine 310 empties, carousel 314 rotates to position the next magazine 310 with cards for processing. Magazines 310 place the cards one at a time on a belt or track under lid 312. The cards travel in series along the belt and pass by a mag stripe read head (under lid 312) which reads the mag stripes on the cards. In one embodiment, cards pass by two mag stripe read heads. The cards are placed in a buffer 316. Cards then pass down a track 320, and receive a label or sticker from a tape roll 322. Cards then exit apparatus 300, and are mated to their appropriate statement or card carrier in apparatus 118 (FIG. 1A).

Figure 4:
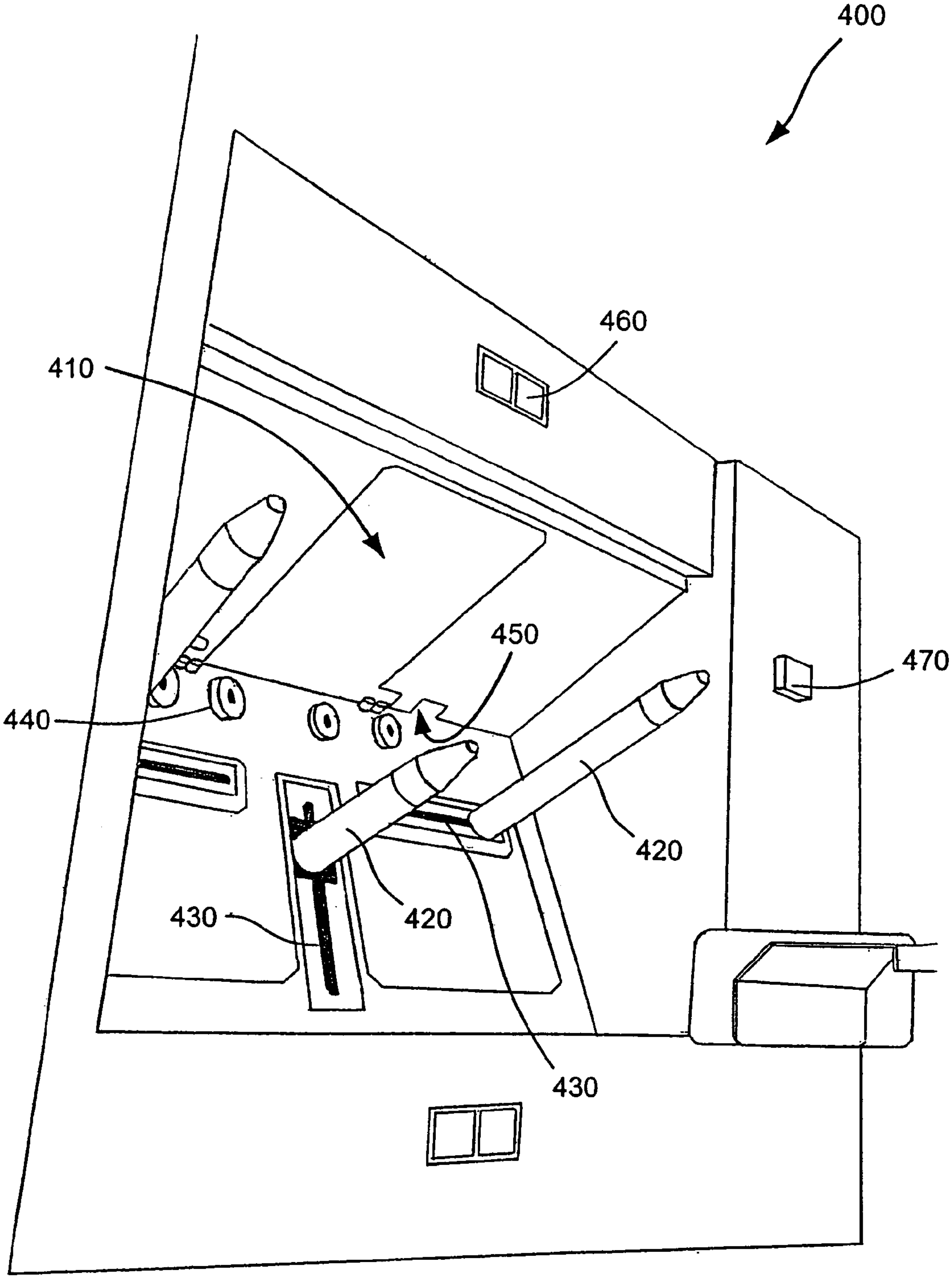
FIG. 4 depicts an insert bin according to the present invention.

FIG. 4 depicts an insert bin 400, which in one embodiment corresponds to bins 128 shown in FIG. 1. Bin 400 includes a stacking region 410 for receipt of a stack of like inserts (not shown). Bin 400 further includes one or more adjustable pins 420 which slide in one or more corresponding grooves 430. Pins 420 are adjusted to conform to the outer dimensions of the stacked inserts. In this manner, bin 400 may be adapted to receive a variety of insert sizes for different applications.

The stacked inserts in region 410 rest on one or more suction devices 440. Suction devices 440 operate to draw the lower-most insert at least partially through a slot 450. The insert then exits the bottom of bin 400 and is matched with the corresponding client statement traversing below bin 400 as referenced in FIG. 1. Each bin 400 has one or more indicator lights 460 and an illuminated reset button 470. In one embodiment, indicator lights 460 are designed to illuminate when a malfunction occurs in bin 400. Malfunctions resulting in indicator light 460 illumination may include a paper jam, the absence of inserts in region 410, and the like. In a particular embodiment, indicator light illuminates when an insert is not pulled through slot 450, and/or more than one insert is pulled through slot 450. In another embodiment, reset button 470 also illuminates when an insert is not pulled through slot 450 at a time when an insert is desired. In a particular embodiment, system 100 includes a controller (not shown), with the controller ceasing operation of system 100, including bins 400, upon a malfunction. Indicator light 460 will illuminate on the bin 400 which caused the system shutdown. Once an operator has cleared the paper jam or otherwise resolved the malfunction, reset button 470 may be pressed to indicate bin 400 is ready to resume operations.

Figure 5:
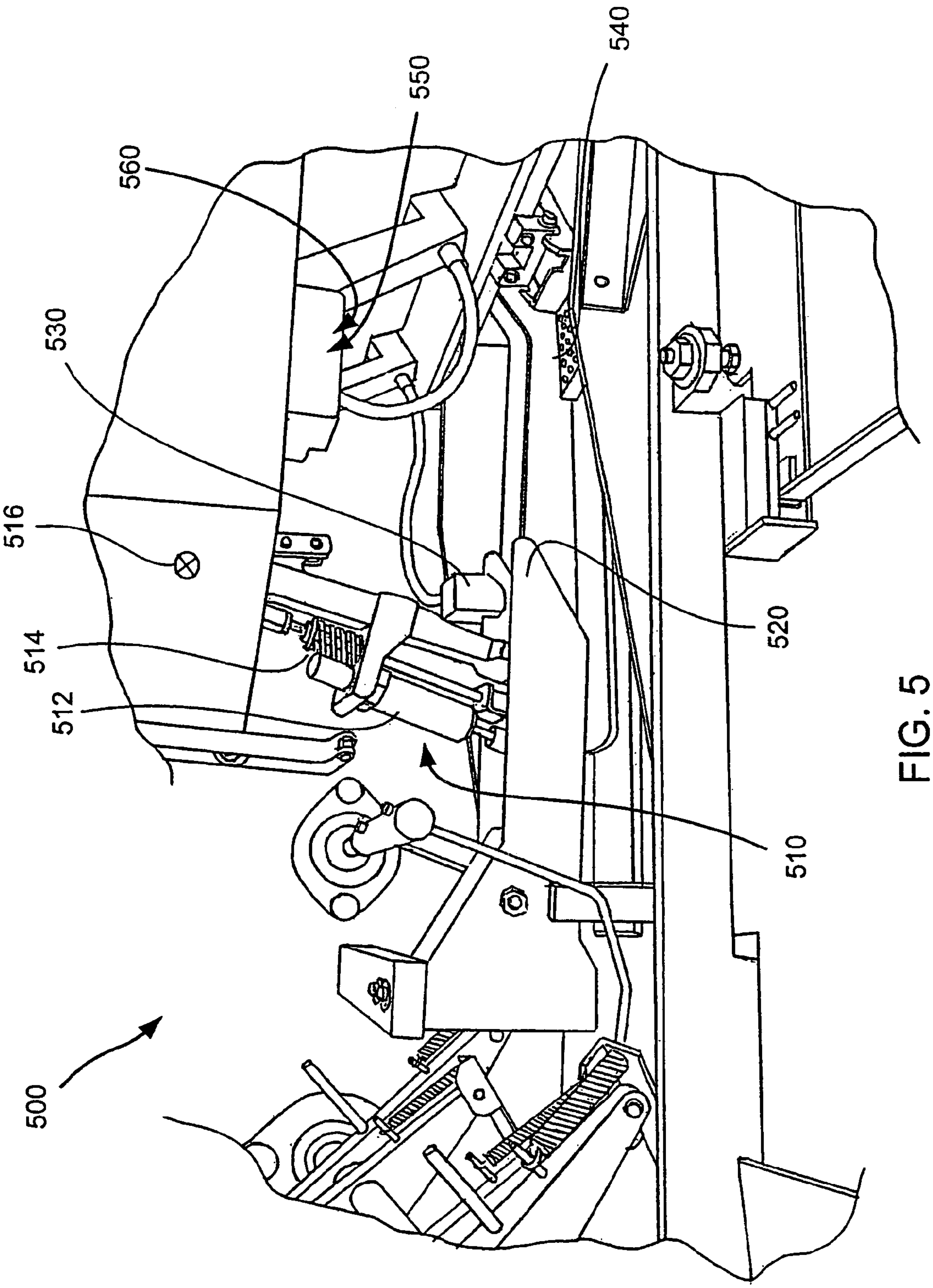
FIG. 5 depicts a portion of an insert grasping mechanism according to the present invention.

Inserts from bin 400 are grasped by a grasping mechanism 500 as shown in FIG. 5. In one embodiment, each bin 400 has a corresponding grasping mechanism 500. Mechanism 500 includes a grasping device or grasper 510 which translates, swings or otherwise moves from left to right as shown in FIG. 5. In one embodiment, grasper 510 includes a piston 512 and a spring 514, and swings about a hinge point 516. Grasper 510 moves to up and to the right in FIG. 5 in order to grasp an insert received from bin 400. In one embodiment, suction devices 440 and/or rollers (not shown) in bin 400 draw the lower-most insert at least partially through slot 450, where it can be grasped by grasper 510. Grasper then moves down and to the left in FIG. 5 to position the insert on top of the statement or card carrier passing below on belt 130. The insert grasped by grasper 510 contacts a deflector 520, which helps remove the insert from grasper 510. In one embodiment, deflector 520 includes a pair of arms between which grasper 510 translates or swings. As a result, the insert is released and placed on the underlying documents, which may include a previously deposited insert.

As grasper 510 translates or swings to grasp a subsequent insert, little clearance exists between a tip of grasper 510 and the previously deposited insert. In some circumstances, the previously deposited insert catches on tips 520 causing dislodging of the insert, paper jams, and the like.

In one embodiment of the present invention, an air direction device 530 is positioned near deflector 520, and in a particular embodiment is coupled to deflector 520. Air direction device 530 has an opening (not shown), which in one embodiment is an elongate slit. The device opening is configured to direct a stream of air towards the previously grasped insert. Air direction device 530 directs the air in a downward direction for the embodiment shown in FIG. 5. Further, while described in one embodiment as a device for directing air, other fluids or gases also may be used within the scope of the present invention. In one embodiment, direction device 530 is coupled to a fluid source, which in one embodiment is an air source.

In this manner, the direction of the fluid from device 530 towards the previously deposited insert helps hold down the deposited insert. This feature helps reduce or eliminate the likelihood that the grasper 510 will catch on the insert as grasper 510 proceeds toward grabbing a subsequent insert. Device 530, in one embodiment, includes a control valve for controlling a rate of gas flow from device 530. The gas flow rate may be varied depending on a wide range of variables, including the amount of static electricity on the sheets, the humidity in the facility containing system 100, the weight and size of the inserts, and the like.

Apparatus 500 further includes a sensor 540 for detecting whether grasper 510 successfully grasps the desired insert. In alternative embodiments, sensor 540 is a pressure sensor, an optical sensor, and the like. In a particular embodiment, sensor 540 is a diffraction grating adapted to induce a phase shift to light reflected therefrom. Sensor 540 operates in conjunction with a light source 550 and a light collector 560. Light source 550 is positioned to direct light at sensor 540, which in this embodiment is a reflective grating 540. If grasper 510 has successfully grasped an insert, light will reflect off the insert to collector 560. If grasper 510 has failed to grab an insert, light from light source 550 reflects off grating 540, with a phase shift induced by grating 540. Light collector 560 then receives the reflected, phase-shifted light and is capable of distinguishing the phase-shifted light from light reflected by an insert. As a result, a controller coupled to apparatus 500, and/or to system 100 can shut down apparatus 500 and/or system 100 for corrective actions, if desired. In one embodiment, indicator light 470 (FIG. 3) illuminates in the event grasper 510 fails to grab an insert. In this manner, an operator can identify which grasper 510 has missed the insert. In another embodiment, indicator light 460 illuminates in the event grasper 510 grabs more than one insert.

Figure 6:
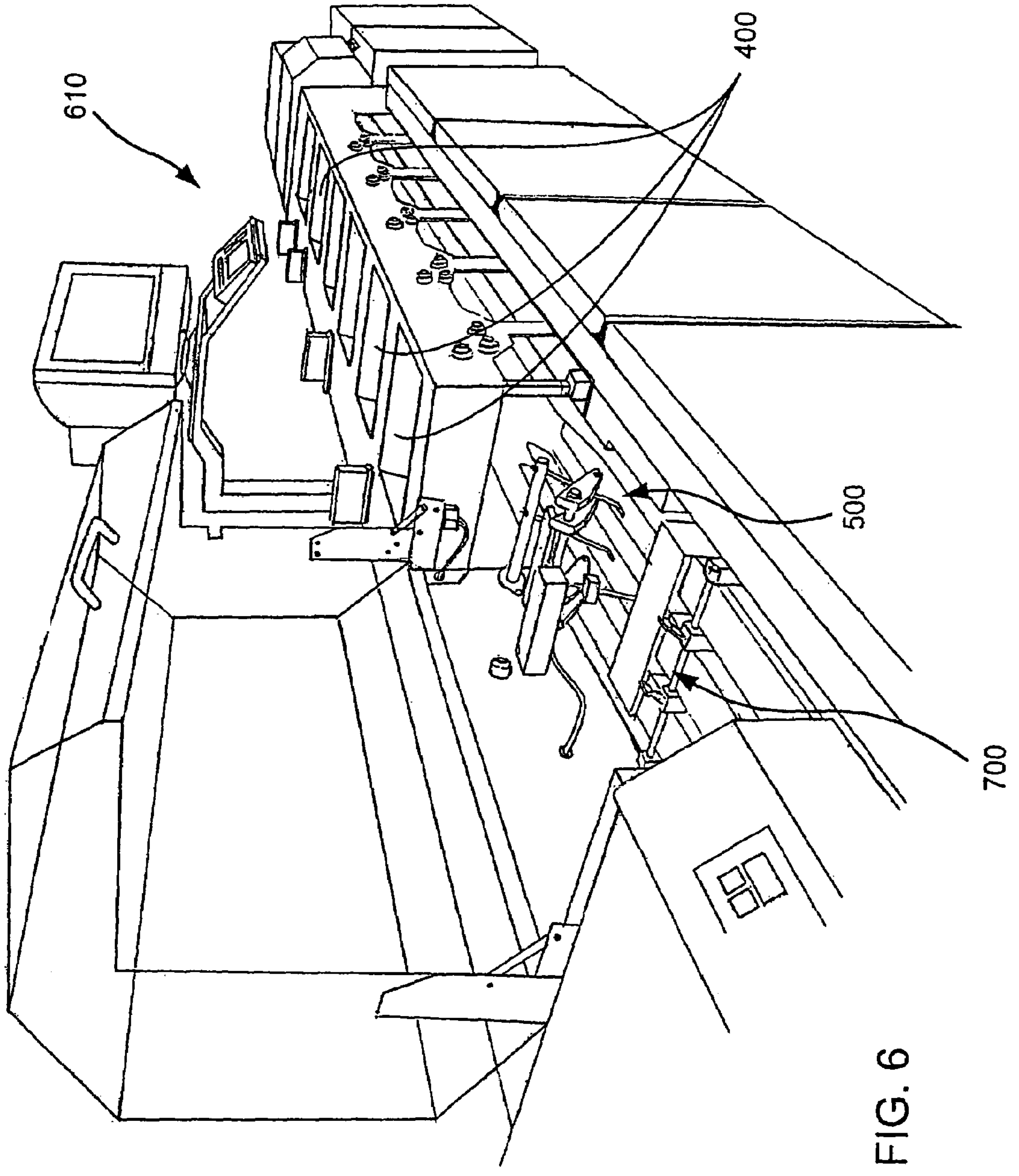
FIG. 6 is an overall view of a portion of a mail processing system according to the present invention.

FIG. 6 depicts a simplified overall view of a portion of system 100. FIG. 6 indicates a series of bins 400 as described in conjunction with FIG. 4, as well as a controller 610. FIG. 6 also includes an envelope insertion device 700, best shown in FIG. 7.

Figure 7:
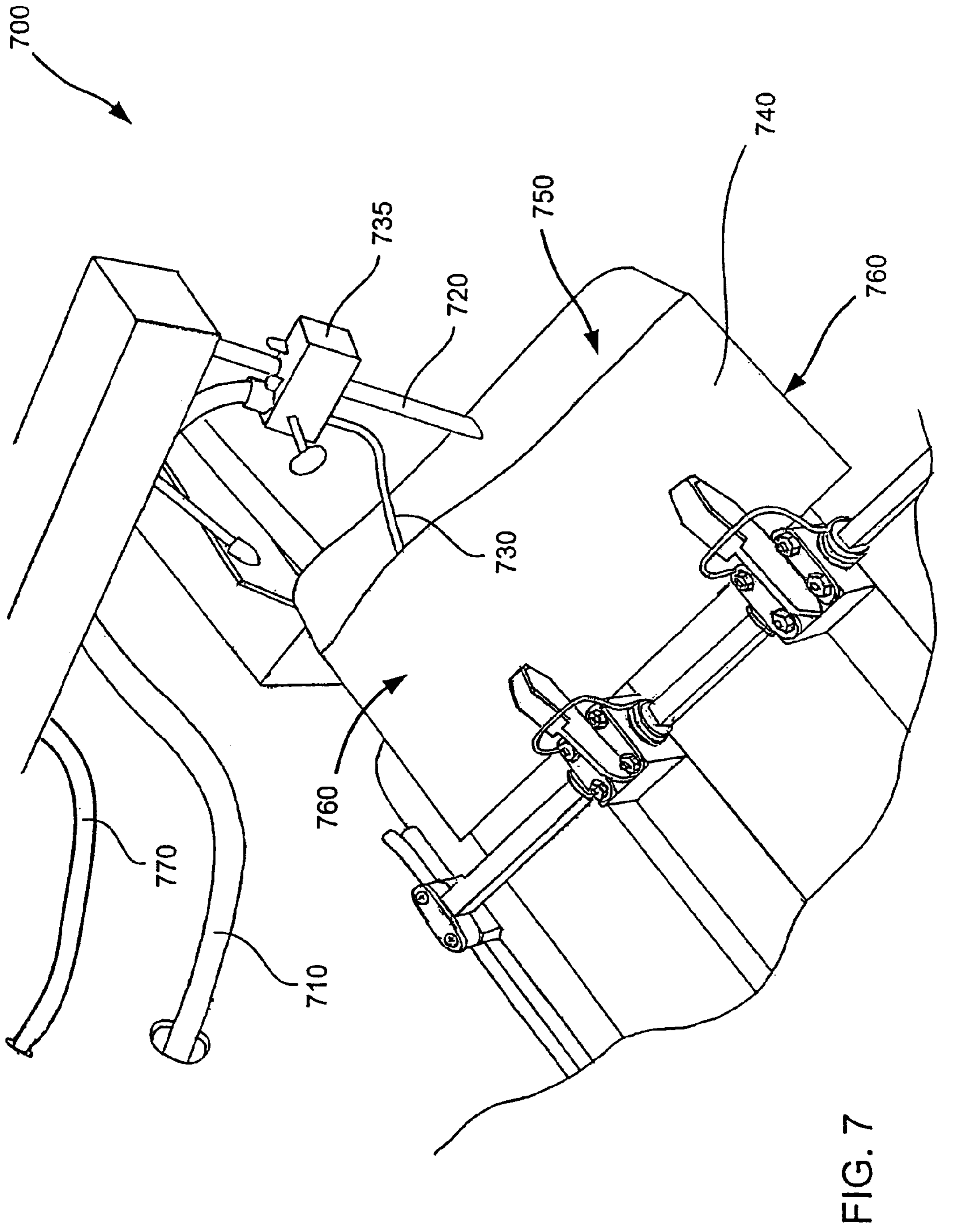
FIG. 7 is a simplified view of a portion of an envelope insertion apparatus according to the present invention.

In one embodiment, envelope insertion device 700 corresponds to unit 132 shown in FIG. 1. Device 700 operates to insert the client statement and/or card carrier, card, and the selected inserts into an envelope for mailing. In one embodiment, apparatus 700 includes a main nozzle 720 and a side nozzle 730 for directing one or more fluid streams towards the envelope. In one embodiment, main nozzle 720 and side nozzle 730 are coupled to separate fluid sources, such as compressed air or other gas sources, using a gas line 710 and a gas line 770, respectively. In another embodiment, both main nozzle 720 and side nozzle(s) 730 are coupled to the same fluid source by gas line 710. A fixture 735 operably couples the two nozzles 720, 730. In this manner, nozzles 720 and 730 are maintained in a desired orientation. In the example of FIG. 7, central main nozzle 720 is larger than side nozzle 730, and the two nozzles point in different directions that are not parallel to each other. In other words, in the example of FIG. 7, the two nozzles 720 and 730 are fixedly coupled together using a fixture in a non-parallel arrangement.

As shown in FIG. 7, main nozzle 720 is designed to direct a fluid stream into the approximate center of an envelope 740. In this manner, fluid stream from nozzle 720 helps open, and maintain open, an opening 750 of envelope 740. While directing the fluid stream toward the center of envelope opening 750 can successfully open the center portion of envelope 740, main nozzle 720 alone may not open envelope 740 along one or more interior edges 760 of envelope 740. Without edges 760 being held open, the stacked papers and inserts may not be successfully inserted into envelope 740. This is particularly the case when the statement and inserts are similar in dimension to the envelope interior.

In one embodiment of the present invention, applicant has incorporated a side nozzle 730 which directs fluid to and towards edges 760 of envelope 740. As a result, envelope opening 750 is more fully opened, increasing the likelihood that the paper inserts are successfully received by envelope 740.

While FIG. 7 depicts only a single side nozzle 730, an alternative embodiment of apparatus 700 uses a second side nozzle 730 directed to the opposing edge of envelope 740. In still another embodiment, main nozzle 720 is directed into the approximate center of envelope opening 750 at an angle sufficient to also direct the air towards one of the envelope edges 760. Side nozzle 730 then directs air towards the opposing edge 760.

In an additional embodiment, device 700, or an adjacent apparatus, operates to seal envelope 740 after receipt of the card and documents. In one particular embodiment, a fluid reservoir (not shown) containing fluid for sealing envelope 740 is coupled to device 700. The reservoir may include a gauge on the outside of the reservoir for indicating the level of fluid therein. In this manner, the level of fluid in the reservoir may be conveniently monitored.

The invention has now been described in detail for purposes of clarity and understanding. However, it will be appreciated that certain changes and modifications may be practiced within the scope of the appended claims.

What is claimed is:

1. A mail processing apparatus comprising;

a track;

an envelope feeder that is adapted to feed an envelope onto the track;

an inserting mechanism that is adapted to place inserts into the envelope; and a nozzle system that is adapted to direct a gas into the envelope to hold the envelope open for the inserts, wherein the nozzle system comprises;

a central nozzle that is adapted to direct said gas into a central region of the envelope; and a side nozzle that is adapted to direct said gas near an edge of the envelope;

wherein the central nozzle directs a greater gas volume into the envelope than the side nozzle.

2. The mail processing apparatus as in claim 1, further comprising a second side nozzle that is adapted to direct said gas near a second edge of the envelope.

3. The mail processing apparatus as in claim 2, wherein the central and side nozzles are fixedly coupled together using a fixture in a non-parallel arrangement.

4. The mail processing apparatus as in claim 1 further comprising a gas adjust nozzle to control a flow rate of said gas through said side nozzle.

5. The mail processing apparatus as in claim 1 further comprising a sealing arrangement that is configured to apply a fluid to the envelope to seal the envelope.

6. The mail processing apparatus as in claim 1 further comprising a fluid reservoir coupled to the sealing arrangement and a gauge for indicating a level of fluid in the reservoir.

7. A method of processing mail, said method comprising;

providing an insert to be placed into an envelope;

feeding the envelope onto a track, said envelope having an opening; and directing a gas into the opening to hold open the envelope to facilitate receipt of the insert by the envelope, said directing comprising;

directing the gas with a central nozzle in a first direction into a central region of the envelope opening; and directing the gas with a side nozzle in a second direction near an edge of the envelope opening;

wherein the central nozzle directs that gas in a first direction, wherein the side nozzle directs the gas in a second direction, wherein the first and second directions are non-parallel and wherein the central nozzle is larger than the side nozzle.

8. A method as in claim 7, further comprising providing a second side nozzle and directing said gas near a second edge of the envelope using the second side nozzle.

9. A method as in claim 7, further comprising arranging the central and side nozzles in a non-parallel arrangement.

10. A method as in claim 7, further comprising adjusting a flow rate of the gas through the side nozzle.

11. A method as in claim 7, further comprising directing a greater gas volume into the envelope through the central nozzle that through the side nozzle.

12. A method as in claim 7, further comprising applying a fluid to the envelope to seal the envelope.

13. A method as in claim 12, further comprising coupling a fluid reservoir to a sealing arrangement and using a gauge to indicate a level of fluid in the reservoir.

* * * * *